United States Patent
Schlarb

(10) Patent No.: US 8,245,255 B2
(45) Date of Patent: Aug. 14, 2012

(54) PROGRAM GUIDE NAVIGATION

(75) Inventor: John M. Schlarb, Duluth, GA (US)

(73) Assignee: Cisco Technology, Inc., San Jose, CA (US)

( * ) Notice: Subject to any disclaimer, the term of this patent is extended or adjusted under 35 U.S.C. 154(b) by 485 days.

(21) Appl. No.: 12/208,434

(22) Filed: Sep. 11, 2008

(65) Prior Publication Data

US 2009/0249399 A1  Oct. 1, 2009

Related U.S. Application Data

(60) Provisional application No. 61/039,629, filed on Mar. 26, 2008.

(51) Int. Cl.
*G06F 3/00* (2006.01)
*G06F 13/00* (2006.01)
*H04N 5/445* (2006.01)

(52) U.S. Cl. ............... 725/52; 725/43; 725/44; 725/50; 725/53; 715/785; 715/787; 348/734

(58) Field of Classification Search ................ None
See application file for complete search history.

(56) References Cited

U.S. PATENT DOCUMENTS

| | | | |
|---|---|---|---|
| 6,195,089 B1 * | 2/2001 | Chaney et al. | 725/56 |
| 6,571,390 B1 * | 5/2003 | Dunn et al. | 725/52 |
| 6,721,953 B1 * | 4/2004 | Bates et al. | 725/39 |
| 7,271,848 B2 * | 9/2007 | Saito | 348/569 |
| 2002/0089545 A1 * | 7/2002 | Levi Montalcini | 345/784 |
| 2003/0046693 A1 * | 3/2003 | Billmaier et al. | 725/39 |
| 2003/0149984 A1 * | 8/2003 | Jacquelyn et al. | 725/52 |
| 2004/0040039 A1 * | 2/2004 | Bernier | 725/46 |
| 2006/0015903 A1 * | 1/2006 | MacBeth et al. | 725/46 |
| 2006/0059525 A1 * | 3/2006 | Jerding et al. | 725/87 |
| 2007/0209018 A1 * | 9/2007 | Lindemann | 715/784 |
| 2009/0007007 A1 * | 1/2009 | Voros et al. | 715/786 |

OTHER PUBLICATIONS

Wikipedia, Moxi, retrieved on Aug. 14, 2008 at http://en.wikipedia.org/wiki/Moxi.
Law Office Computing, AportisDoc Mobile Edition 2.2, retrieved on Aug. 14, 2008 at http://www.lawofficecomputing.com/old_site/Reviewsdata/dj01/aportisdoc.asp.

* cited by examiner

*Primary Examiner* — Dominic D Saltarelli
*Assistant Examiner* — Jason J Chung
(74) *Attorney, Agent, or Firm* — Merchant & Gould

(57) ABSTRACT

Systems and methods that provide a first electronic program guide (EPG) screen having a plurality of channel identifiers, program information, and an icon corresponding to increasing scroll speed, and responsive to a user selection corresponding to the icon, enable a user to scroll among the plurality of channel identifiers at the increased scroll speed.

10 Claims, 7 Drawing Sheets

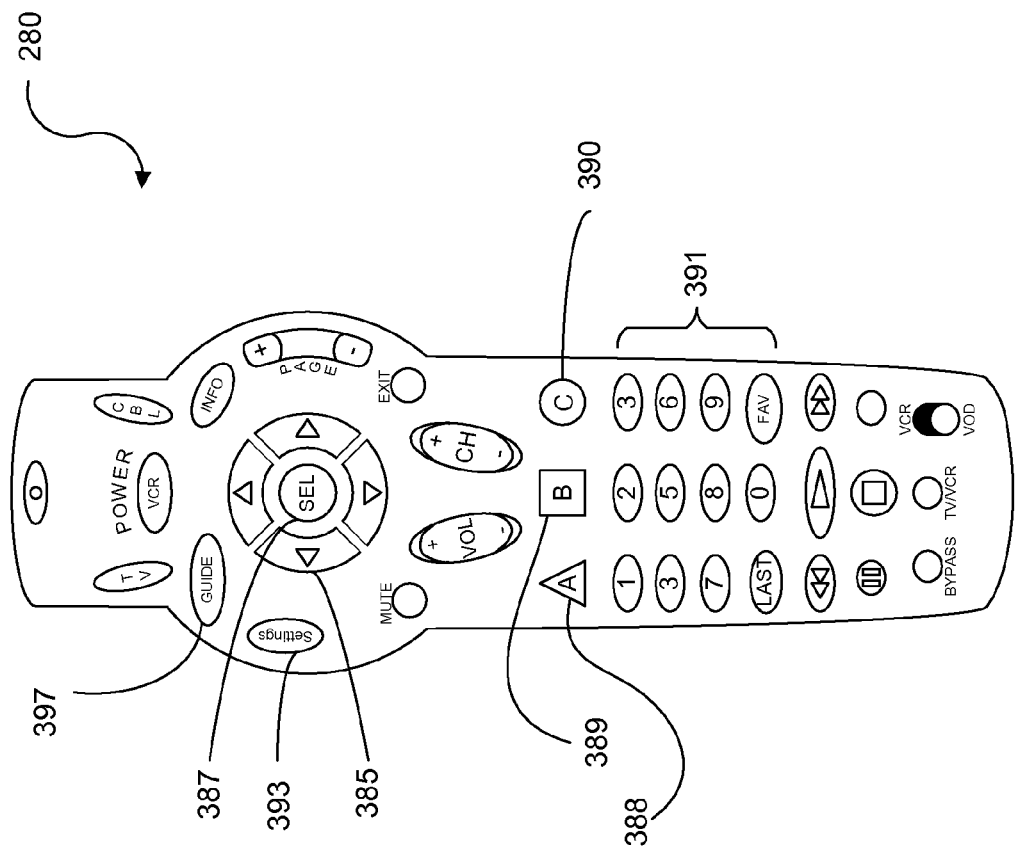

PROGRAM GUIDE NAVIGATION

CROSS REFERENCE TO RELATED APPLICATION

This application claims priority to copending U.S. provisional patent application entitled "Program Guide Navigation" filed on Mar. 26, 2008 and accorded Ser. No. 61/039,629, which is entirely incorporated herein by reference.

TECHNICAL FIELD

Particular embodiments are related to user interfaces used in subscriber television systems.

BACKGROUND

With recent advances in digital transmission technology, subscriber television systems are now capable of providing much more than traditional analog broadcast video. In implementing enhanced programming, the set-top box or set-top terminal (STT) has become an important computing device for accessing content services (and content within those services) and navigating a user through a maze of available services. In addition to supporting traditional analog broadcast video functionality, STTs now also support an increasing number of two-way digital services such as video-on-demand and personal video recording.

Typically, a STT is coupled to a cable or satellite, or generally, a subscriber television system, and includes hardware and software necessary to provide the functionality of the digital television system at a user's site. Some of the software executed by a STT can be downloaded and/or updated via the subscriber television system. Each STT also typically includes a processor, communication components, and memory, and is connected to a television or other display device, such as a personal computer. While many conventional STTs are stand-alone devices that are externally connected to a television set, a STT and/or its functionality may be integrated into a television set or personal computer or even an audio device such as a programmable radio, as will be appreciated by those of ordinary skill in the art.

Many STTs located in subscriber television systems today are available with an electronic program guide (EPG) that is presented on a display device (e.g., TV) in a grid view. Typically, the grid view includes television channel or service identifiers (e.g., broadcast channel numbers and/or service identifiers, such as ABC, CNN, etc.) listed on one border of the grid along a vertical axis of the EPG, and time (e.g., time of content presentation or availability for viewing) in defined increments (e.g., increments of one half hour) listed on another border of the grid along the horizontal axis. Titles of content instances (e.g., programs, such as movies, episodes of television shows, sports events or other entertainment events, etc.) are shown within the borders of the grid in blocks, each block defined by the channel and duration of time the content instance is available for presentation.

Users typically navigate through the grid to view what programs are available at any given time and/or to learn more about the program title listed in a desired block. For instance, a user can use an infrared (IR) remote control device to scroll or page down the channel listings. As more and more types of programming become available to subscribers, the number of channels to scroll through increases as well. Although various "shortcuts" (e.g., SKIP and BACK keys on a remote) have been implemented in the past to shorten the navigation time though an EPG, given the hundreds of channels to choose from, it may still take up to approximately a minute to reach a channel of interest. Since performance is important to users, a common complaint is that existing scroll mechanisms are simply too slow. This perceived shortcoming is further aggravated by the fact that many STTs are low-cost embedded platforms, with application performance bounded by low central processor unit (CPU) MIPs (million instructions per second), and further aggravated by the existence of platforms that use the same CPU for processing audio/video (A/V) packets as is used for implementing applications.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 3 is a schematic diagram that illustrates an exemplary remote control device.

DESCRIPTION OF EXAMPLE EMBODIMENTS

Overview

Figure 1:
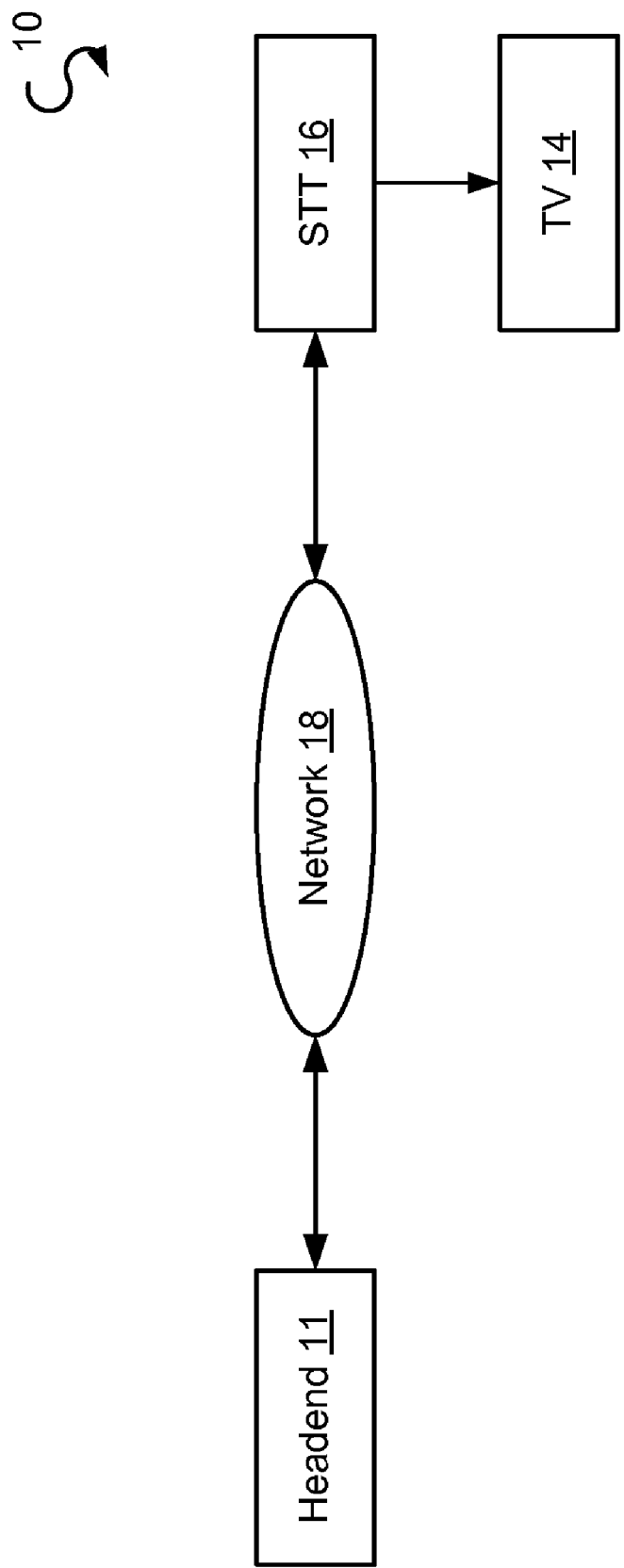
FIG. 1 is a block diagram of an environment in which one embodiment of a system and method for navigating in an electronic program guide (EPG) is implemented.

Systems and methods that provide a first electronic program guide (EPG) screen having a plurality of channel identifiers, program information, and an icon corresponding to increasing scroll speed, and responsive to a user selection corresponding to the icon, enable a user to scroll among the plurality of channel identifiers at the increased scroll speed.

Example Embodiments

Disclosed herein are various system and method embodiments for facilitating navigation in an electronic program guide (EPG), collectively referred to herein as a quickfind system. The quickfind system provides an EPG navigation mode that enables a user, during (e.g., exclusively) the duration of the mode to more quickly scroll to a channel or time of interest (e.g., time slots) than existing guide navigation systems. In one embodiment, the user enters (e.g., commences) a defined quickfind mode or state using a designated remote control key or button. In the quickfind mode, only the channel identifiers and time axis are rendered. Additionally, helpful instructions are provided to a user to make the user aware of commencement of the mode, the manner of use of quickfind features, and/or how to terminate the mode. In the quickfind mode, program information, such as program titles, descriptive text of a highlighted program in a grid, etc., is not rendered, which frees up processing resources (e.g., a central processing unit (CPU)), enabling speedier navigation through the EPG. In some embodiments, other program guide-specific information may be omitted from the rendering process during the quickfind mode, such as one or more of corresponding grid lines of the EPG screen, channel logos, operator logos, video or static pictures of the content instance from which the EPG was launched, etc.

Although certain embodiments of the quickfind system are described herein in the context of a subscriber television system, it should be understood that other communication or media systems requiring menu navigation can similarly benefit. Further, although described in the context of an EPG (e.g., grid-style), it should be understood that other navigable menus (e.g., non-grid formats, non-EPG, etc.) may similarly utilize and benefit from the functionality embodied by the quickfind system.

Since certain embodiments of the quickfind system are described in the context of a subscriber television system, an exemplary subscriber television system is described, followed by descriptions of exemplary set-top terminals (STTs), remote control devices, and then illustration of operations of an embodiment of a quickfind system. Certain embodiment of the quickfind system may, however, be embodied in many different forms and should not be construed as limited to the embodiments set forth herein; rather, these embodiments are provided so that this disclosure will be thorough and complete, and will fully convey the scope of the disclosure to those having ordinary skill in the art. Furthermore, all "examples" given herein are intended to be non-limiting, and are included as examples among many others contemplated and within the scope of the disclosure.

FIG. 1 is a block diagram depicting a non-limiting example of a subscriber television system (STS) 10. In this example, the STS 10 includes a headend 11 and a set-top terminal (STT) 16 that are coupled via a communications network 18, such as a digital broadband network. It will be appreciated that the STS 10 shown in FIG. 1 is merely illustrative and should not be construed as implying any limitations upon the scope of the disclosure. For example, although single components (e.g., a headend and an STT) are illustrated in FIG. 1, the STS 10 can feature a plurality of any one of the illustrated components, or may be configured with alternative embodiments for any one of the individual components or with yet other additional components not enumerated above. Subscriber television systems also included within the scope of the disclosure include systems not utilizing physical structured cabling for transmission, such as, but not limited to, satellite systems.

An STT 16 is typically situated at a residence or place of business of a user and may be a stand-alone unit or integrated into another device such as, for example, a television set, a personal computer, a communications device (e.g., cellular phone with menu features, personal digital assistants, etc.), or other display devices, or an audio device. The customer's premises may be a user's residence or place of business, among others. The STT 16 receives signals (carrying video, audio and/or other data) from the headend 11 through the network 18 and provides reverse information to the headend 11 through the network 18.

In one implementation, the headend 11 receives, among other content, program guide information from a program guide information provider (not shown). The program guide information preferably comprises data corresponding to services that may be provided via the STT 16. The headend 11 edits the program guide data and transmits the edited program guide data to the STT 16 via the network 18. The headend 11 may include one or more server devices (not shown) for providing video, audio, and/or data to client devices such as the STT 16. The headend 11 and the STT 16 cooperate to provide a user with television services via the television set 14. The television services may include, for example, broadcast television services, cable television services, premium television services, video-on-demand (VOD) services, Internet services, messaging services, and/or pay-per-view (PPV) services, among others.

Figure 2:
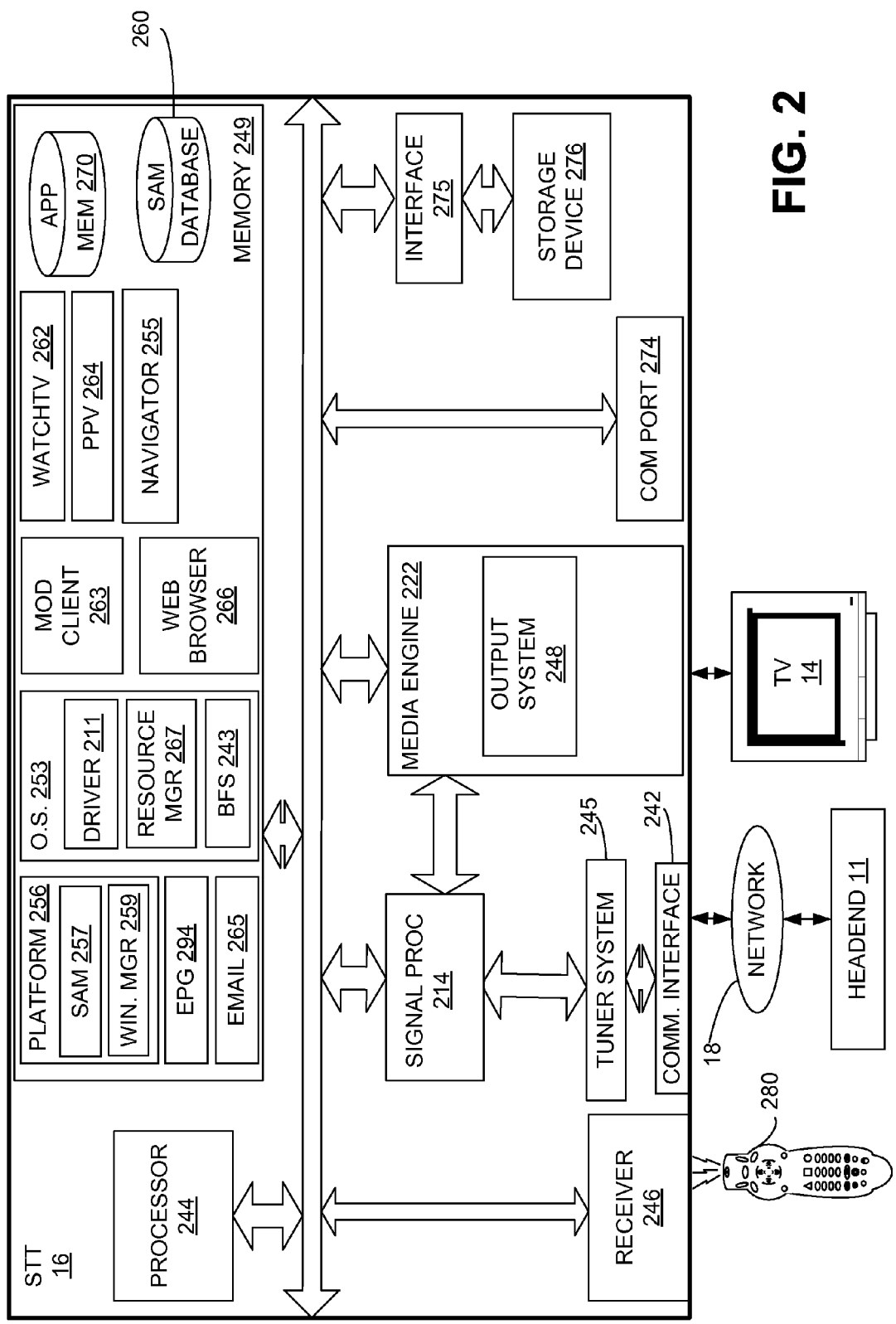
FIG. 2 is a block diagram that illustrates one embodiment of a set-top terminal in which an embodiment of an EPG application resides.

FIG. 2 is a block diagram illustration of an embodiment of an STT 16 that is coupled to a headend 11 and to a television set 14. It will be understood that the STT 16 shown in FIG. 2 is merely illustrative and should not be construed as implying any limitations upon the scope of the disclosure. For example, some of the functionality performed by applications executed in the STT 16 (such as an MOD application 263) may instead be performed completely or in part at the headend 11 and vice versa, or not at all in some embodiments. The STT 16 preferably includes a communications interface 242 for receiving signals (video, audio and/or other data) from the headend 11 through the network 18 and for providing any reverse information to the headend 11 through the network 18.

The STT 16 preferably includes one or more processors, such as processor 244 (e.g., a central processing unit or digital signal processor), for controlling operations of the STT 16, an output system 248 for driving the television set display, and a tuner system 245 for tuning into a particular television channel or frequency to display content and for sending and receiving various types of content to and from the headend 11. The STT 16 may include, in some embodiments, multiple tuners for receiving downloaded (or transmitted) content. The tuner system 245 enables the STT 16 to tune to downstream media and data transmissions, thereby allowing a user to receive digital and/or analog content delivered in the downstream transmission via the subscriber television system. The tuner system 245 includes, in one implementation, an out-of-band tuner for bi-directional QPSK data communication and one or more QAM tuners (in band) for receiving television signals. Additionally, a receiver 246 receives externally generated information, such as user inputs or commands from an input device, such as remote control device 280, or other devices.

The STT 16 processes analog and/or digital transmission signals for storage in a storage device 276 (communicated via interface 275) and/or for display to the television set 14. Storage device 276 comprises a hard disk drive. In some embodiments, storage device 276 may comprise other types of media storage devices, such as an optical disk drive comprising one or more media (e.g., compact disks, digital video disks, etc.). The STT 16 preferably includes a signal processing system 214 and a media engine 222. The components of the signal processing system 214 are capable of QAM demodulation, forward error correction, and demultiplexing MPEG-2 transport streams, and parsing elementary streams and packetized elementary streams. Additional components, not shown, include an analog decoder and compression engine for processing an analog transmission signal and, in one implementation, converting it to compressed audio and video streams that are produced in accordance with the syntax and semantics of a designated audio and video coding method, such as specified by the MPEG-2 audio and MPEG-2 video ISO/IEC 13818 standard, H.264, among others.

The signal processing system 214 outputs packetized compressed streams and presents them as input for storage in the storage device 276, or in other implementations, as input to the media engine 222 for decompression by a video decompression engine (not shown) and an audio decompression engine (not shown) for display on the TV set 14. One having ordinary skill in the art will appreciate that the signal processing system 214 will preferably include other components not shown, including memory, decryptors, samplers, digitizers (e.g., analog-to-digital converters), and multiplexers, among other components. Further, it will be understood that one or more of the components listed above will interface with the processor 244 and/or system memory 249 (and/or dedicated memory for a particular component) to facilitate data transfer and/or processing of the video and/or audio signals for display and/or storage.

One or more programmed software applications are executed by utilizing the computing resources in the STT 16. Note that an application typically, though not necessarily, includes a client part and a server counterpart that cooperate to provide the complete functionality of the application. The applications may be resident in memory 249, which can be volatile and/or non-volatile memory, or downloaded (or uploaded) into memory 249. Applications stored in memory 249 are executed by the processor 244 under the auspices of the operating system 253. The operating system 253 includes, among other things, at least one resource manager 267 that provides an interface to resources of the STT 16 such as, for example, computing resources. The operating system 253 also includes a broadcast file system (BFS) client 243 that cooperates with a BFS server (not shown) located at, for instance, the headend 11, to receive data and/or applications that are delivered from the BFS server in a carousel fashion. The operating system 253 further includes device drivers, such as device driver 211, which work in cooperation with the operating system 253 to provide operating instructions for communicating with peripheral devices, such as a remote control device, or internal components, such as an integrated storage device.

Data required as input by an application is stored in memory 249 and read by the processor 244 as need be during the course of application execution. Input data may be data stored in memory 249 by a secondary application or other source, either internal or external to the STT 16, or possibly anticipated by the application and thus created with the application at the time it was generated as a software application. Data generated by an application is stored in memory 249 by the processor 244 during the course of application execution. Memory 249 also includes application memory 270 that various applications may use for storing and/or retrieving data.

An application referred to as a navigator 255 is also resident in memory 249 for providing a navigation framework for services provided by the STT 16. The navigator 255 registers for and in some cases reserves certain user inputs related to navigational keys such as channel increment/decrement, Last channel, Favorite channel, quickfind key, etc. The navigator 255 also provides users with television related menu options that correspond to STT functions such as, for example, blocking a channel or a group of channels from being displayed in a channel menu presented on a screen display. In one embodiment, once an EPG application 294 is launched, the quickmode features are provided by the EPG application 294 in cooperation with the remote control device 280 as manipulated by the user.

Memory 249 also includes a platform library 256. The platform library 256 is a collection of utilities useful to applications, such as a timer manager, a compression manager, a configuration manager, a hyper text markup language (HTML) parser, a database manager, a widget toolkit, a string manager, and other utilities (not shown). These utilities are accessed by applications via application programming interfaces (APIs) as necessary so that each application does not have to contain these utilities. Two components of the platform library 256 that are shown in FIG. 2 include a window manager 259 and a service application manager (SAM) client 257.

The window manager 259 includes a mechanism for implementing the sharing of the screen regions and user input. The window manager 259 is a component that, in one embodiment, is part of the platform 256, but in some embodiments may be part of the operating system 253. The window manager 259 on the STT 16 is responsible for, as directed by one or more applications, implementing the creation, display, and de-allocation of the limited STT screen resources. The window manager 259 allows multiple applications to share the screen by assigning ownership of screen regions, or windows. The window manager 259 communicates with the resource manager 267 to coordinate available resources (such as display memory) among different resource consuming processes. Such processes may be directly or indirectly invoked by one or more applications.

The SAM client 257 is a client component of a client-server pair of components, with the server component (not shown) being located at the headend 11, preferably in a digital network control system. A SAM database 260 in memory 249 includes a data structure of services and a data structure of channels that are created and updated by the headend 11. Herein, database will refer to a database, structured data or other data structures as is known to those of ordinary skill in the art. Applications can also be downloaded into memory 249 at the request of the SAM client 257, typically in response to a request by the user or in response to a message from the headend 11. In the example STT 16 illustrated in FIG. 2, memory 249 includes a media-on-demand (MOD) application 263, an e-mail application 265, a web browser application 266, the EPG application 294, a WatchTV application 262, and a Pay Per View (PPV) application 264 to provide the corresponding services. It should be clear to one with ordinary skill in the art that these applications are not limiting and merely serve as examples for embodiments of the disclosure. These applications, and others provided by the subscriber television system operator, are top-level software entities on the network for providing services to the user.

An executable program or algorithm corresponding to an operating system (OS) component, or to a client platform component, or to an application, or to respective parts thereof, can reside in and execute out of memory 249. Likewise, data input into or output from any executable program can reside in memory 249. Furthermore, an executable program or algorithm corresponding to an operating system component, or to a client platform component, or to an application, or to respective parts thereof, can reside in memory 249, or in a local storage device externally connected to or integrated into the STT 16 (e.g., storage device 276) and be transferred into memory 249 for execution. Likewise, data input for an executable program can reside in memory 249 or a storage device and be transferred into memory 249 for use by an executable program or algorithm. In addition, data output by an executable program can be written into one portion of memory 249 by an executable program or algorithm and be transferred into another portion of memory 249 or into a storage device. In some embodiments, the executable code is not transferred, but instead, functionality is effected by other mechanisms.

The STT 16 can also include one or more wireless or wired interfaces, also called communication ports 274, for receiving and/or transmitting data to other devices. For instance, the STT 16 may feature USB (Universal Serial Bus), Ethernet (for connection to a computer), IEEE-1394 (for connection to content devices in an entertainment center), serial, and/or parallel ports, among others.

An example remote control device 280 to provide input to the STT 16 is illustrated in FIG. 3. The example remote control device 280 includes a select button 387 for making selections on a screen display, and navigation buttons 385 for navigating within a particular screen display. The example remote control device 280 also includes alphanumeric buttons 391 for entering display channel numbers. The "A" 388, "B" 389, and "C" 390 buttons or keys (e.g., remote control buttons or remote control keys) can correspond to certain application-defined functions that have a corresponding "A", "B", or "C" symbol or icon displayed in a graphic user interface (GUI) presented on a display device. In one embodiment, the "B" button 389 is used to commence the quickfind mode and hence enable enhanced scrolling for a defined duration of the mode with the display of assistive text, graphics, and/or audio to provide user-friendly implementation of the quickfind system as described further below. It will be appreciated that other buttons or other mechanisms may be used in lieu of the "B" button 389 in some embodiments. In some embodiments, the selection of these symbols "A," "B," and "C" may be permitted directly via a touch screen display or via an interactive screen that displays a cursor manipulated by the remote control device 280 which can select these and other symbols or icons on the screen to evoke a response, somewhat similar to computer-mouse interactions known in the art. The guide button 397 may be used to access a television program guide such as, for example, an EPG screen. The settings button 393 enables a user to access user settings. Many alternative methods of providing user input may be used including a remote control device with different buttons and/or button layouts, a keyboard device, a voice activated device, etc. The embodiments described herein are not limited by the type of device used to provide user input.

Figure 4A:
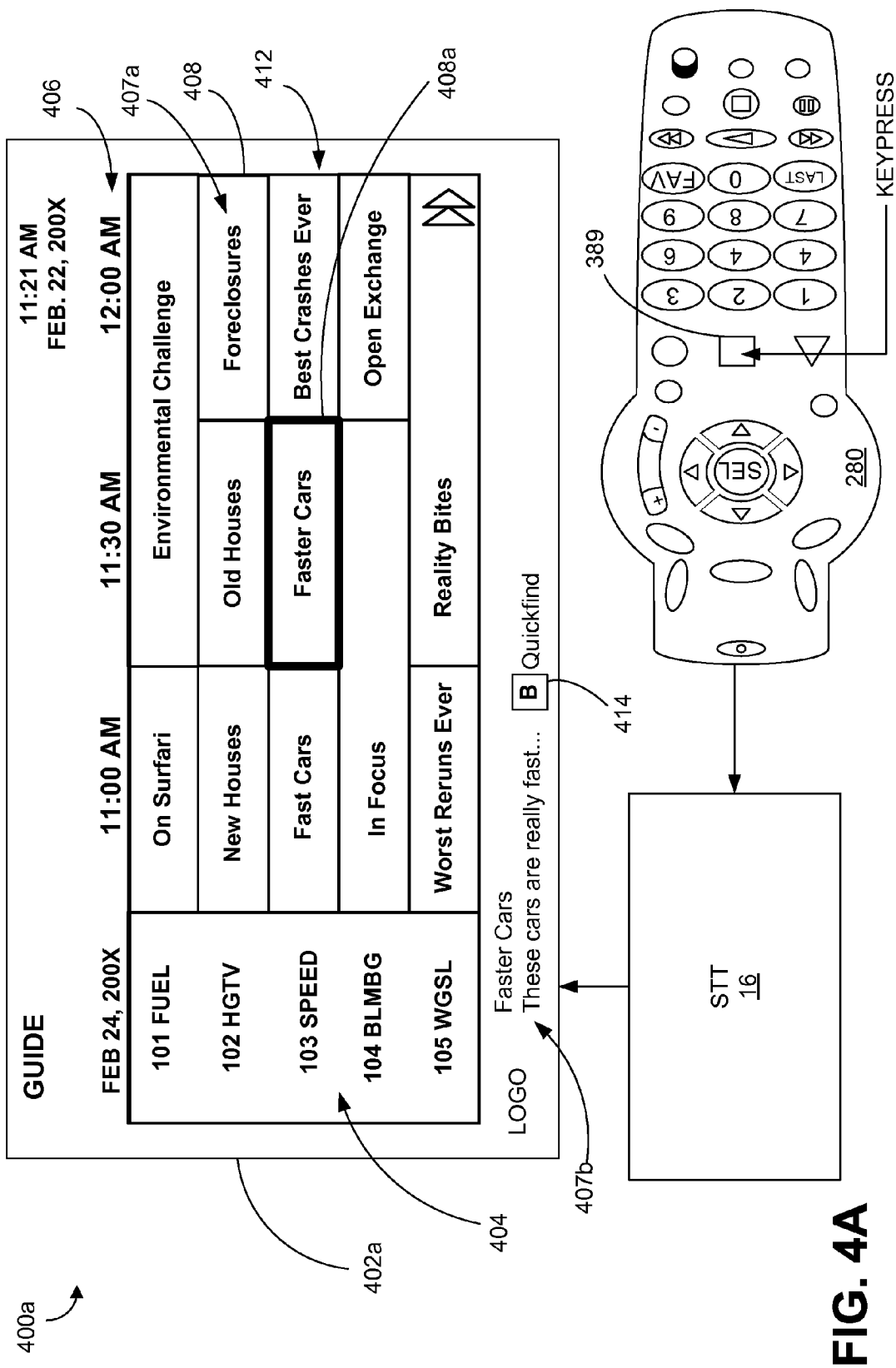
FIGS. 4A-4C are composite diagrams that illustrate an embodiment of a method for invoking a quickfind mode for enabling enhanced navigation in an EPG.
Figure 4B:
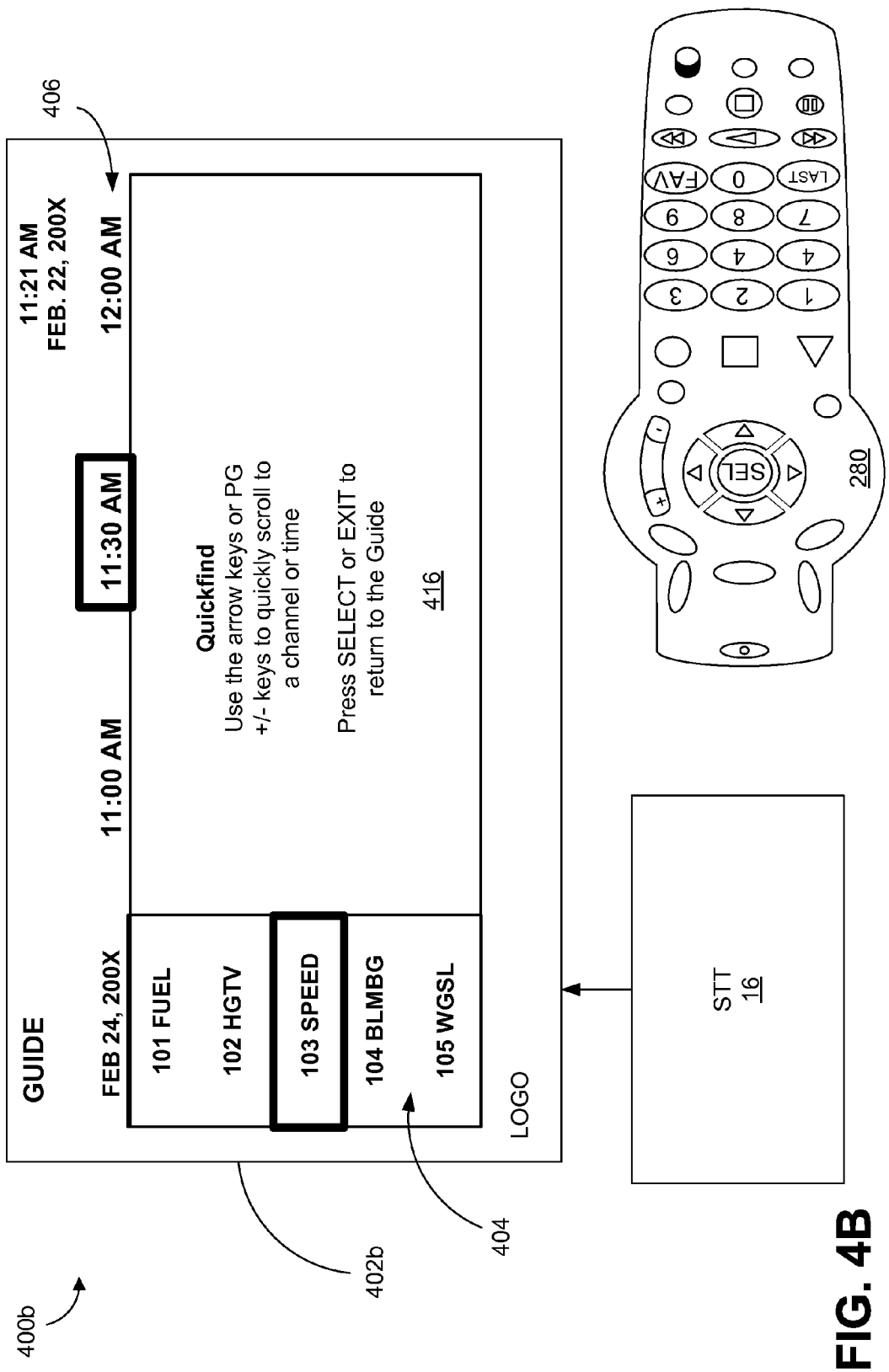
Figure 4C:
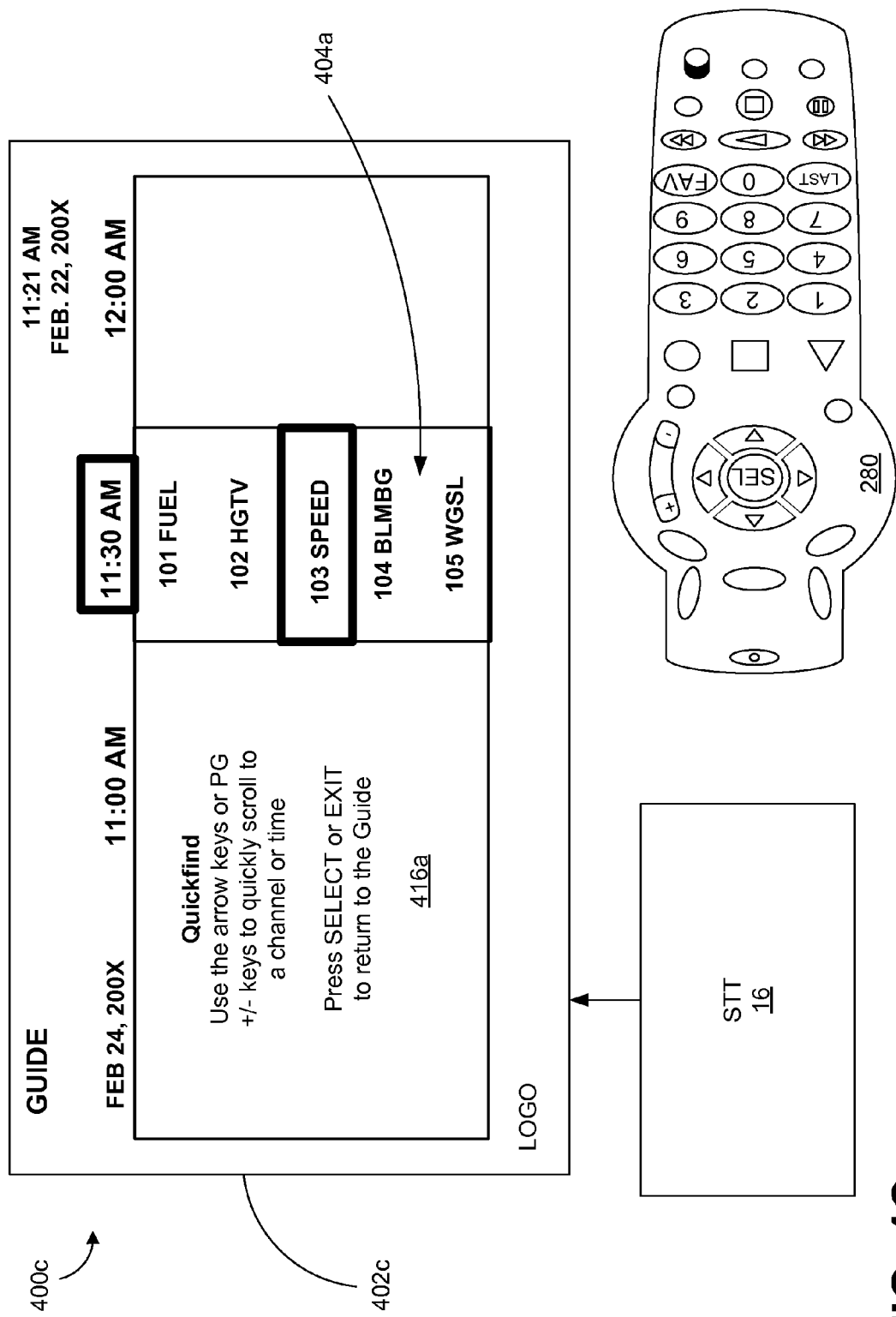

FIGS. 4A-4C are composite diagrams 400a-400c that include an example EPG screen 402 displayed on a display device (e.g., such as TV set 14, not shown in FIGS. 4A-4C for purposes of brevity), a STT 16 configured to provide the EPG screen 402 to the display device, and a remote control device 280 that provides input to the STT 16 responsive to user selection or activation of the keys or buttons on the remote control device 280. User keypresses (e.g., user activation of remote control key(s), or also referred to as remote control keypress(es)) are represented by the word "KEYPRESS" in association with an arrow symbol that points to the quickfind ("B") button 389. For the sake of simplicity in discussion, the EPG screens 402 of FIGS. 4A-4C are illustrated in abbreviated format, showing an EPG grid and date information and some program guide-specific information, with the understanding that other formats and/or information (e.g., streaming video, static picture, shortcut button icons, etc.) may be included in some embodiments. FIGS. 4A-4C are described in the context of an exemplary scenario whereby the user is viewing an EPG screen 402 and then decides to invoke a quickfind mode.

Referring to FIG. 4A, a composite diagram 400a is illustrated, and includes an EPG screen 402a presented on a display device (not shown), the STT 16, and the remote control device 280. The EPG screen 402a is configured, in one embodiment, with a grid format that includes a list or column of channel identifiers 404 (shown from top to bottom in ascending sequential channel order along with a corresponding service identifier, but configurable in other formats), a time row 406, and program information 407 that includes program titles 407a and descriptive information 407b. Each of the program titles 407a are located in a respective program block 408 among a plurality of program blocks 408. In other words, each program block 408 is labeled with an accompany program title 407a. A program block 408, such as highlighted program block 408a, is bounded in each row by a start and end time (e.g., a time slot) delineated by the times in time row 406 (e.g., blocks 408 are located beneath one or more respective time of availability) and by channel row delineated by a channel identifier 404, in this case channel row 412 corresponding to the "103 Speed" channel identifier. The user may advance or navigate a highlight symbol (e.g., an "empty" box that surrounds and highlights the periphery of each block 408 or other mechanisms of distinction) in row and column directions using navigation keys 385 (FIG. 3). The EPG screen 402a also includes program guide-specific information, such as the grid "lines" or other graphics (e.g., arrow icons, etc.), operator logos, current date and time information, among other information. For instance, program guide specific information (or also referred to as program specific information) may also include in some embodiments scalable video or static images (not shown), for instance located above the grid, channel logos, etc. The EPG screen 402a also includes a quickfind icon 414 that suggests to the user that advanced or enhanced navigation or scroll (e.g., speed scroll) features are available. The quickfind icon 414 corresponds to a like-symbol ("B") on the remote control device 280, and may be selectable directly on the screen 402a (e.g., using a displayed cursor manipulated by the remote control device 280 or directly via a touch screen implementation) in some embodiments, or as in the present example, used as an association mechanism to direct the user's attention to the corresponding symbol on the remote control device 280.

Other variations are contemplated to be within the scope of the disclosure. For instance, in one embodiment, the quickfind icon 414 is continuously displayed in the EPG screen 402a. In some embodiments, the quickfind icon 414 is displayed intermittently or responsive to detecting the initial scroll operations effected by a user (e.g., detecting an IR signal corresponding to a back or skip keypress (not shown), detecting a defined threshold of EPG screen changes or refreshes resulting from activating a scroll function, etc.). In some embodiments, the availability of quickfind functionality may be made known to a user via a scrolling text message accompanying the EPG screen 402a, or via pop-up in some embodiments. In some embodiments, the quickfind icon 414 may be omitted from the EPG screen 402a, with existence of such functionality made known to a user via a dedicated and labeled button (e.g., labeled quickfind) on the remote control device 280. In some embodiments, a brief text description may be displayed next to the quickfind icon 414 (e.g., before user actuation). In some embodiments, a combination of some or all of these options, or others, for raising awareness of the quickfind features may be available to a user.

Responsive to a user selecting the quickfind icon 414 via a keypress of the quickfind button 389, a quickfind "mode" is invoked, whereby the EPG screen 402a of FIG. 4A is replaced (e.g., refreshed) with the EPG screen 402b shown in the composite diagram 400b of FIG. 4B. Additionally, in some embodiments, the channel row 412 and time row 406 locations corresponding to the row and column areas of the grid from which the block 408a was highlighted just prior to when the quickfind mode was invoked are each highlighted. For instance, the 11:30 slot in the time row 406 and channel 103 from the channel list 404 are highlighted, corresponding to the block 408a that was highlighted in the EPG screen 402a to just prior the time when the quickfind mode was invoked. In some embodiments, the highlight is omitted. Note that although highlighting is described herein as a mechanism to distinguish a selection located in one area of the EPG screen 402 from other areas of the screen 402, other mechanisms of distinction may be used as should be appreciated by one having ordinary skill in the art.

In the EPG screen 402b (e.g., responsive to commencement of the quickfind mode), the program information, previously displayed in the screen 402a of FIG. 4A as program titles 407a and descriptive text 407b, is omitted in the screen 402b (as are various program guide-specific information, such as the grid lines beyond the channel list 404), and replaced with a quickfind information area 416 (or also referred to as information area) that occupies the body of the grid (less the list of channel identifiers 404 and time row 406). In one embodiment, the quickfind information area 416 comprises information pertaining to operation of a quickfind system, such as explicit information or explicit instructions (e.g. displayed information or instructions on the screen 402 and/or aural information or instructions, as opposed to merely implied) that informs or instructs a user how to use the quickfind system and how to exit or terminate the quickfind mode and return to normal scroll functionality for use with the EPG screen 402. Omitting the program information 407a, 407b frees up the processor 244 from the updating and/or rendering of program information, enabling the user to scroll through the channel list 404 at a faster rate. By providing the quickfind information area 416, the user is made aware of the enhanced scroll features of the quickfind system. Note that the content of the quickfind information may be located elsewhere in the screen 402b in some embodiments.

Various combinations of omission can be implemented in the quickfind system to improve processor performance over that used for rendering the EPG screen 402a (i.e., over the pre-quickfind mode screen). For instance, in some embodiments, the program information 407a, 407b is omitted but program guide-specific information, such as the grid lines, are retained. In some embodiments, as reflected in FIG. 4B, the program information 407a, 407b and one of the program guide-specific information, such as the grid lines, are omitted. In some embodiments, one or more of the program guide-specific information can be omitted in addition to the program information 407a, 407b, such as channel logos, operator logos, time and date information, video, still image or images, and/or graphics (e.g., icons). Note that in some embodiments, the choice of which features of the EPG screen 402a to omit, in response to invocation of the quickfind mode, can be configured by a user, such as via a configuration screen.

Once the quickfind mode is commenced, the user is instructed to scroll by using an appropriate remote control scroll key (or simply, scroll key), such as the arrow keys (e.g., navigation keys 385, which enables scrolling line-by-line) or ± keys (e.g., page keys, which enables scrolling page-by-page) to quickly scroll to a channel or time. Scrolling may be implemented by the user "pecking" at the appropriate scroll key, and/or using the Turboscroll feature implemented by several manufacturers. In Turboscroll, a single, prolonged depression of the appropriate scroll key provides for several initial low frequency (e.g., 1 Hz) scroll advances (line-by-line or page-by-page, depending on the scroll key used) followed by a high frequency a scroll advance (e.g., 10 Hz). Noteworthy is the fact that, contrary to the Turboscroll or other conventional scroll mechanisms, despite the release of the appropriate scroll key, the scroll mode (i.e., quickfind mode) does not terminate, but continues until deliberately terminated by the user through the use (e.g., activation) of a separate key from that used to scroll.

Once the user has found the desired channel and/or time, the user presses a designated button or key on the remote control device 14 (e.g., SELECT 387 (FIG. 3), or others not shown such as Exit, OK, etc.) that is separate from the scroll key. In some embodiments, the user terminates the quickfind mode by directing or manipulating a displayed cursor to a selectable icon displayed on the EPG screen 402b to exit or terminate the quickfind mode, and returns to the full guide view (e.g., EPG screen 402a), which is fully populated with the program information and program guide-specific information. By requiring a separate keypress to terminate the quickfind mode, the user is not burdened in wasted time or effort with recommencing the enhanced scroll features (if needed) upon releasing the appropriate scroll keys.

As explained above, the quickfind system provides several benefits over conventional scroll systems and methods. For instance, the presentation of the quickfind icon 414, and the quickfind information area 416 upon commencement of the quickfind mode, raises awareness of the advanced scroll features, providing for consumer satisfaction in utilization of available features and a user-friendly environment. In contrast, in conventional systems that use Turboscroll, the EPG screen does not make a user aware of such enhanced scroll features, resulting in underutilization of available features and a customer sense of need for better performance. Additionally, the commencement and termination of the quickfind mode is accomplished through deliberate key presses of distinct keys (e.g., scroll keys are distinct from termination keys), the enabling of speed scrolling continuing (e.g., the mode continuing) irrespective of whether the user releases (e.g., terminates the depression or activation of) the scroll key. In Turboscroll, release of the appropriate scroll key terminates the scroll feature. If a user seeks to recommence Turboscroll, the user must follow the sequence of the initial slow advance followed by the high frequency advance. In other words, the user is burdened with added time and inconvenience in re-commencing enhanced scroll features or advanced navigation features if there is a deliberate or inadvertent release of the Turboscroll key.

The EPG screens 402a, 402b shown in FIGS. 4A-4B are exemplary and hence not intended to be limiting. That is, variations of the EPG screen in the quickfind mode are contemplated to be within the scope of the disclosure. For instance, FIG. 4C shows a composite diagram 400c that illustrates one example EPG screen 402c having a different format than that shown in FIG. 4B, whereby the quickfind information area 416a and the column or list of channel identifiers 404a switch locations. In other words, the channel identifiers 404a are centrally located in the grid and the quickfind information area 416a is located on the left hand side of the grid.

Additionally, it is noted that the screens 402 described above will be similarly configured when speed scrolling in the quickfind mode across different time slots (e.g., information area 416 as described above yet with the time slots advancing (or retreating) within a day or across plural days).

Figure 5:
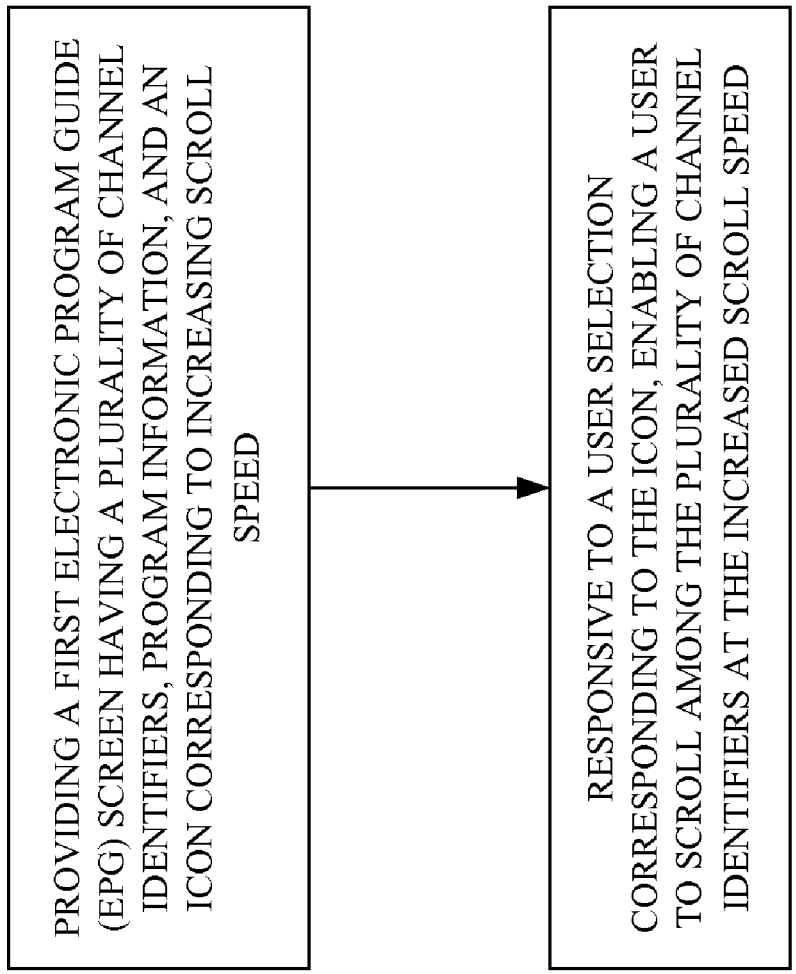
FIG. 5 is a flow diagram that illustrates an embodiment of a method for navigating in an EPG.

In view of the above description, it should be appreciated that one method embodiment 500, shown in FIG. 5 comprises providing a first electronic program guide (EPG) screen having a plurality of channel identifiers, program information, and an icon corresponding to increasing scroll speed (502) and, responsive to a user selection corresponding to the icon, enabling a user to scroll among the plurality of channel identifiers at the increased scroll speed (504).

The flow diagram of FIG. 5 shows the architecture, functionality, and operation of a possible implementation of the EPG application 294. In this regard, each block represents a module, segment, or portion of code, which comprises one or more executable instructions for implementing the specified logical function(s). It should also be noted that in some alternative implementations, the functions noted in the blocks may occur out of the order noted in FIG. 5. For example, two blocks shown in succession in FIG. 5 may in fact be executed substantially concurrently or the blocks may sometimes be executed in the reverse order, depending upon the functionality involved, as will be further clarified hereinbelow.

The EPG application 294 can be implemented in hardware, software, firmware, or a combination thereof. In the preferred embodiment(s), the EPG application 294 is implemented in software or firmware (e.g., application software) that is stored in a memory and that is executed by a suitable instruction execution system. If implemented in hardware, as in an alternative embodiment, some or all of the functionality of the quickfind features of the EPG application 294 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The EPG application 294, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

It should be emphasized that the above-described embodiments of the present disclosure are merely possible examples of implementations, merely setting forth a clear understanding of the principles of the disclosure. Many variations and modifications may be made to the above-described embodiments without departing substantially in principle. All such modifications and variations are intended to be included herein within the scope of the disclosure and protected by the following claims.

At least the following is claimed:

1. A method, comprising:
   providing a first electronic program guide (EPG) screen having a plurality of channel identifiers, program information, a first icon for activating adjustable scrolling speed;
   responsive to a user selection of the first icon, providing a second icon corresponding to increasing scroll speed; and
   responsive to a user selection corresponding to the second icon, enabling a quick find mode to enable a user to scroll among the plurality of channel identifiers at the increased scroll speed, wherein enabling the user to scroll among the plurality of channel identifiers at the increased speed comprises providing a second EPG screen in place of the first EPG screen where the program information is not rendered, wherein the second EPG screen comprises an information area comprises displayed information that explicitly informs the user how to scroll among the plurality of channel identifiers at the increased scroll speed, and wherein in the quick find mode only the channel identifiers and time axis are rendered, wherein enabling comprises commencing the quick find mode that enables scrolling during a duration of the quick find mode irrespective of whether a remote control key press activated to scroll at the increase scroll speed is released by the user, wherein the duration of the quick find mode is terminated responsive to a user selection of a remote control key that is separate from the remote control scroll key at the increase scroll speed, the remote control key suggested to the user by the second icon, wherein the information area further comprises explicit instructions to the user as to how to exit from the quick find mode and return to normal scroll functionality.

2. The method of claim 1, wherein providing further comprises providing the first EPG screen with a grid format, the grid format comprising a plurality of rows, each row comprising program blocks with program information comprising program titles for corresponding programs located within each block, the grid format further comprising a time row with plural times of presentation of programs located in the time row, wherein the program blocks are located beneath a respective time of availability of presentation for a respective program.

3. The method of claim 1, wherein the program information comprises program titles.

4. The method of claim 3, wherein the program information comprises descriptive text corresponding to the program titles.

5. The method of claim 1, wherein enabling further comprises providing a second EPG screen in place of the first EPG screen where program specific information is not rendered.

6. The method of claim 5, wherein the program specific information comprises at least one of a grid lines, channel logo, operator logo, time and date information, video, still image, and graphics.

7. A system, comprising:
   a memory with application software; and
   a processor configured with the application software to:
      provide a first electronic program guide (EPG) screen having a plurality of channel identifiers and time slot, program information, and a first icon for activating adjustable scrolling speed,
      responsive to a user selection corresponding to the first icon, provide a second icon corresponding to increasing scroll speed, and
      responsive to a user selection corresponding to the second icon, enable a quick find mode to enable a user to scroll among the plurality of channel identifiers and the time slots at the increased scroll speed, wherein enabling the user to scroll among the plurality of channel identifiers and time slots at the increased speed comprises rendering, a second EPG screen in place of the first EPG screen, where the program information is not rendered within the EPG, only the plurality of channel identifiers, and time slots, wherein the second EPG screen comprises an information area comprises displayed information that explicitly informs the user how to scroll among the plurality of channel identifiers at the increased scroll speed, and wherein in the quick find mode program information is not rendered, wherein enabling comprises commencing the quick find mode that enables scrolling during a duration of the quick find mode irrespective of whether a remote control key press activated to scroll at the increase scroll speed is released by the user, wherein the duration of the quick find mode is terminated responsive to a user selection of a remote control key that is separate from the remote control scroll key at the increase scroll speed, the remote control key suggested to the user by the second icon, wherein the information area further comprises explicit instructions to the user as to how to exit from the quick find mode and return to normal scroll functionality.

8. The system of claim 7, further comprising a display device, wherein the processor is further configured with the application software to present the first EPG screen on the display device.

9. A system comprising:
   a memory with application software; and
   a processor configured with the application software to:

provide a first electronic program guide (EPG) screen having a plurality of channel identifiers and program information, responsive to a user selection corresponding to a first icon, providing a second icon corresponding to increasing scroll speed, and responsive to a user selection corresponding to the second icon, enabling a quick find mode to enable a user to scroll among the plurality of channel identifiers and time slots at the increased scroll speed, wherein enabling a user to scroll among the plurality of channel identifiers and time slots at the increased scroll speed comprises the processor being further configured to provide a second EPG screen in place of the first EPG screen, where the program information is not rendered, having rendered only the plurality of channel identifiers and the time slots, wherein the second EPG screen comprises an information area comprises displayed information that explicitly informs the user how to scroll among the plurality of channel identifiers at the increased scroll speed, and wherein in the quick find mode program information is not rendered, wherein enabling comprises commencing the quick find mode that enables scrolling during a duration of the quick find mode irrespective of whether a remote control key press activated to scroll at the increase scroll speed is released by the user, wherein the duration of the quick find mode is terminated responsive to a user selection of a remote control key that is separate from the remote control scroll key at the increase scroll speed, the remote control key suggested to the user by the second icon, wherein the information area further comprises explicit instructions to the user as to how to exit from the quick find mode and return to normal scroll functionality.

10. The method of claim 1, wherein providing the second EPG screen further comprises providing the information area, the information area being configurable by the user.

* * * * *